(12) United States Patent
Shetty et al.

(10) Patent No.: US 8,161,159 B1
(45) Date of Patent: Apr. 17, 2012

(54) NETWORK CONFIGURATION WITH SMART EDGE SERVERS

(75) Inventors: Pritham Shetty, Los Altos, CA (US); Srinivas Manapragada, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1340 days.

(21) Appl. No.: 11/263,652

(22) Filed: Oct. 31, 2005

(51) Int. Cl.
*G06F 15/173* (2006.01)

(52) U.S. Cl. ....................................... 709/226

(58) Field of Classification Search .................. None
See application file for complete search history.

(56) References Cited

U.S. PATENT DOCUMENTS

| | | | |
|---|---|---|---|
| 5,751,968 A | 5/1998 | Cohen et al. | |
| 5,805,804 A | 9/1998 | Laursen et al. | |
| 5,841,432 A | 11/1998 | Carmel et al. | |
| 5,892,915 A | 4/1999 | Duso et al. | |
| 6,044,205 A | 3/2000 | Reed et al. | |
| 6,064,379 A | 5/2000 | DeMoney | |
| 6,085,252 A | 7/2000 | Zhu et al. | |
| 6,112,024 A | 8/2000 | Almond et al. | |
| 6,148,334 A | 11/2000 | Imai et al. | |
| 6,163,796 A | 12/2000 | Yokomizo | |
| 6,216,157 B1 | 4/2001 | Vishwanath et al. | |
| 6,393,486 B1 | 5/2002 | Pelavin et al. | |
| 6,397,230 B1 | 5/2002 | Carmel et al. | |
| 6,434,622 B1 | 8/2002 | Monteiro et al. | |
| 6,453,355 B1 | 9/2002 | Jones et al. | |
| 6,477,580 B1 | 11/2002 | Bowman-Amuah | |
| 6,487,564 B1 | 11/2002 | Asai et al. | |
| 6,543,053 B1 | 4/2003 | Li et al. | |
| 6,549,934 B1 | 4/2003 | Peterson et al. | |
| 6,564,246 B1 * | 5/2003 | Varma et al. | 709/205 |
| 6,631,418 B1 | 10/2003 | Watkins | |
| 6,760,378 B1 | 7/2004 | Conklin | |
| 6,763,390 B1 | 7/2004 | Kovacevic et al. | |
| 6,801,947 B1 | 10/2004 | Li et al. | |
| 6,823,394 B2 | 11/2004 | Waldvogel et al. | |
| 6,877,010 B2 | 4/2005 | Smith-Semedo et al. | |
| 6,985,932 B1 | 1/2006 | Glaser et al. | |
| 6,989,856 B2 * | 1/2006 | Firestone et al. | 348/14.09 |
| 6,990,497 B2 | 1/2006 | O'Rourke et al. | |
| 6,999,424 B1 | 2/2006 | Kovacevic et al. | |
| 7,003,570 B2 | 2/2006 | Messinger et al. | |
| 7,133,922 B1 | 11/2006 | She et al. | |
| 7,149,813 B2 | 12/2006 | Flanagin et al. | |
| 7,200,681 B1 | 4/2007 | Lewin et al. | |
| 7,383,289 B2 | 6/2008 | Kraft et al. | |

(Continued)

OTHER PUBLICATIONS

"Quicktime Sreaming Server Administrator's Guide," Apple Compter, Inc. 2002**.

(Continued)

*Primary Examiner* — George C Neurauter
*Assistant Examiner* — Suraj Joshi
(74) *Attorney, Agent, or Firm* — Fish & Richardson P.C.

(57) ABSTRACT

A collaboration network is defined by creating a virtual meeting room on a central server. The central server negotiates with one or more edge servers for remote management of selected collaboration parameters, which control such things as shared objects, group connections, streaming video, and video on-demand. Using the selected collaboration parameters, the edge servers manage the meeting participation of the network clients connected to the virtual meeting room through the individual edge servers. When management of the meeting participation requires either parameters that the edge server does not have or when the parameters of the edge server are out of date, the management responsibility is transferred to the central server for that request.

15 Claims, 7 Drawing Sheets

U.S. PATENT DOCUMENTS

| | | | |
|---|---|---|---|
| 2001/0004417 | A1 | 6/2001 | Narutoshi et al. |
| 2002/0055989 | A1 | 5/2002 | Stringer-Calvert et al. |
| 2002/0065926 | A1 | 5/2002 | Hackney et al. |
| 2002/0071438 | A1 | 6/2002 | Singh |
| 2002/0103815 | A1 | 8/2002 | Duvillier et al. |
| 2002/0116716 | A1 | 8/2002 | Sideman |
| 2003/0005455 | A1 | 1/2003 | Bowers |
| 2003/0046431 | A1 | 3/2003 | Belleguie |
| 2003/0061369 | A1 | 3/2003 | Aksu et al. |
| 2003/0115268 | A1 | 6/2003 | Esposito |
| 2003/0142666 | A1 | 7/2003 | Bonney et al. |
| 2003/0154239 | A1 | 8/2003 | Davis et al. |
| 2003/0187993 | A1* | 10/2003 | Ribot .................. 709/227 |
| 2003/0221014 | A1 | 11/2003 | Kosiba et al. |
| 2004/0032424 | A1 | 2/2004 | Florschuetz |
| 2004/0064832 | A1* | 4/2004 | Tsukidate et al. ........... 725/14 |
| 2004/0077345 | A1 | 4/2004 | Turner et al. |
| 2004/0098533 | A1 | 5/2004 | Henshaw et al. |
| 2004/0215803 | A1 | 10/2004 | Yamada et al. |
| 2004/0225728 | A1* | 11/2004 | Huggins et al. .............. 709/223 |
| 2005/0120061 | A1* | 6/2005 | Kraft ................ 707/203 |
| 2005/0172323 | A1* | 8/2005 | Yang et al. ................ 725/109 |
| 2006/0161516 | A1 | 7/2006 | Clarke et al. |

OTHER PUBLICATIONS

"Chapter 6: What is Streaming Media and How does it Work?", RealNetworks, 1999, accessed Jul. 18, 2007, http://service.real.com/help/player/plus_manual.g2/htmlfiles/whatisrp.htm.**.

"Advantages of On2 VP6 Technology", On2 Technologies white paper, Oct. 20, 2006. **.

"Truemotion VP7 Video Codec", On 2 Technologies white paper, Jan. 10, 1005. **.

"Common Multimedia Formats and Extentions", SorensonMedia, accessed Jul. 18, 2007, <http://www.sorensotech.com/learn/video_file_format.php>.**.

Schulzrinne, H. et al., "Real Time Streaming Protocol (RTSP)", The Internet Society, Apr. 1998.

U.S. Appl. No. 11/263,590, filed Oct. 31, 2005, Office Action dated Dec. 24, 2008, to be published by the USPTO, 15 pages.

U.S. Appl. No. 11/263,590, filed Oct. 31, 2005, Office Action dated Aug. 21, 2009, to be published by the USPTO, 16 pages.

U.S. Appl. No. 11/263,590, filed Oct. 31, 2005, Office Action dated May 27, 2010, to be published by the USPTO, 17 pages.

U.S. Appl. No. 11/263,074, filed Oct. 31, 2005, Office Action dated Feb. 11, 2009, to be published by the USPTO, 21 pages.

U.S. Appl. No. 11/263,074, filed Oct. 31, 2005, Office Action dated Oct. 7, 2009, to be published by the USPTO, 25 pages.

Office Action in U.S. Appl. No. 11/263,590 mailed May 27, 2010, 18 pages.

Fish & Richardson, Amendment in Reply to Action of May 27, 2010 in U.S. Appl. No. 11/263,590, filed Oct. 28, 2010, 20 pages.

Notice of Allowance and Fee(s) Due in U.S. Appl. No. 11/263,590 mailed Jan. 11, 2011, 8 pages.

* cited by examiner

NETWORK CONFIGURATION WITH SMART EDGE SERVERS

CROSS-REFERENCE TO RELATED APPLICATIONS

The present application is related to concurrently filed, and commonly assigned U.S. patent application Ser. No. 10/366,646, now U.S. Pat. No. 7,272,658 issued Sep. 18, 2007; U.S. patent application Ser. No. 10/402,357, now U.S. Pat. No. 7,287,256 issued Oct. 23, 2007; U.S. patent application Ser. No. 11/263,074, currently abandoned; and U.S. patent application Ser. No. 11/263,590, now U.S. Pat. No. 7,945,615 issued May 17, 2011; the disclosures of which are hereby incorporated herein by reference.

TECHNICAL FIELD

The present invention relates, in general, to distributed computing, and, more particularly, to a distributed computing network configuration with smart edge servers.

BACKGROUND OF THE INVENTION

In the realm of computing, the relationship that drives most useful distributed applications is the client-server relationship. The interaction between client and server allows most computing beyond an unconnected, single computer. The client-server relationship defines an architecture in which a user's computer, which may be a personal computer (PC), may be the client machine or entity requesting something from a server, which is the supplying machine or entity. However, a PC may also operate as the server side of the client-server relationship. Both are typically connected via some kind of network, such as a local area network (LAN) or wide area network (WAN).

In the client-server model, the client typically processes the user interface (WINDOWS™, MACINTOSH™, etc.) and may perform some or all of the application processing. Servers may range in capacity from high-end PCs to mainframes. A database server typically maintains databases and processes requests from the client to extract data from or to update the database. An application server, which is a software server, typically provides additional business processing for the clients.

While many client-server models are now commonly referred to as "Web based" and/or "Web enabled," the architecture is conceptually the same. Users' PCs may still be clients, and there are tens of thousands of Web servers throughout the Internet delivering Web pages and other functionality. On the Web, the client typically runs the browser and, just like legacy client/server systems, can perform a little or a lot of processing, such as simply displaying hypertext mark-up language (HTML) pages, processing embedded scripts, or considerable processing with JAVA™ applets. A myriad of browser plug-ins provide all sorts of possibilities for client processing.

Figure 1:
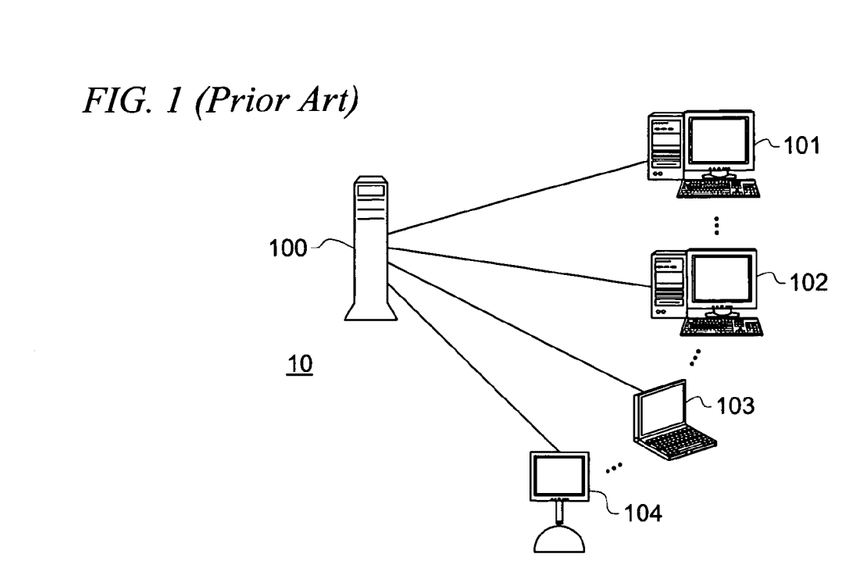
FIG. 1 is a block diagram illustrating a typical client-server system.

FIG. 1 is a block diagram illustrating typical client-server system 10. Server 100, which may be a network server, a Web server, or the like, hosts a remote application that is available to clients 101-104. As each of clients 101-104 desires to access the remote application, a connection is made between the client and server 100. The client, such as client 101, issues a request to server 100 to access the remote application. Server 100 activates the remote application, performs whatever logic calculations the remote application is designed to perform and then transmits the results back to client 101. This relationship is a request-response relationship. For example, if server 100 is a Web server and client 101 is a Web browser. The user at client 101 enters a Web address into client 101. Client 101 issues a request for the page index for the Web address to server 100. When server 100 receives the request, it processes the necessary logic to create the Hypertext Markup Language (HTML) file the makes up the requested Web page, or accesses the stored HTML file, and transmits it back to client 101. Client 101 then displays the HTML file to the user.

During the early days of the Internet, its client-server architecture was used as a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication that has been a key part of personal and business life in the last 5-10 years. The Internet explosion was due, in part, to the development of the Web and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally not been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect, at least initially, across the Internet to share voice, video, and data in real time for meetings, presentations, training, or the like.

In such collaborative meeting environments, a virtual meeting room typically is made up of several meeting objects which are generally containers for presentation information, such as slides, video, audio, documents, computer applications, and the like, that are themselves contained within the container of the meeting room. These meeting objects are typically placed into a static arrangement on the actual electronic meeting interface. Therefore, chat objects may be set on the bottom right of each meeting interface screen, while slide or other main presentation objects are set on the left half of each meeting interface screen. Once the meeting begins, each of the meeting participants, both presenters and viewers, usually see the same static meeting interface with the presenters information loaded thereon.

One example of an electronic collaboration application and system is MACROMEDIA INC.'s BREEZE™ rich Internet communication system (RICS). A RICS system is an application and its underlying infrastructure that implements an electronic collaboration system that shares and collaborates multimedia information, such as audio, video, and data. Because of the collaboration of such multimedia information in a real time system, it is advantageous to manage any particular electronic meeting on a single computer or collaboration server. However, managing an electronic meeting on a single collaboration server provides a finite limit to the number of meeting participants that may experience the electronic meeting.

This type of single-server meeting implementation leverages a direct client-server architecture. Referring back to FIG. 1, the illustration of client-server system 10 provides an accurate depiction of the single-server meeting implementation. A client computer, typically the computer used by a meeting participant, such as client 102, connects directly into the central collaboration server, server 100, managing the meeting. The central collaboration server, server 100, has a finite limit to the number of connections that it can efficiently manage for the meeting. Thus, without a dedicated, proprietary network, electronic meetings have been limited in capacity.

A logical extension to the single-server, client-server architecture has involved the deployment of additional servers that maintain high speed communication with the main server, but that are located in remote areas closer to the clients. The remote servers' role is to take the load from the central server and distribute it closer to the clients. Content Delivery Networks (CDN) typically employ servers on the edges of the network. These servers, referred to typically as edge servers maintain copies of the content that can be regionally distributed to the clients within that edge server's region. Thus, a client in Dallas, Tex. accessing a music downloading system, that employs an edge-driven CDN, may download a particular song from an edge server located in Austin, Tex., while a client in San Francisco, Calif., of the same music downloading system may download the same song from an edge server located in Palo Alto, Calif. Both clients access the same system, using the same Uniform Resource Locator (URL), but then download the content from regionally different edge servers.

One such CDN is operated by AKAMAI TECHNOLOGIES, INC. AKAMAI employs its EDGESUITE™ Delivery Service to provide localized delivery of content, to more-efficiently manage a content deliver system. In application, the edge servers in the CDN each store copies of the available content. Thus, when a local client requests a particular document from the central system, the local edge server will be tasked with delivering that content. This system relieves the central system from performing too much copying and delivering, which may adversely affect the bandwidth or efficiency performance of the central system.

Figure 2:
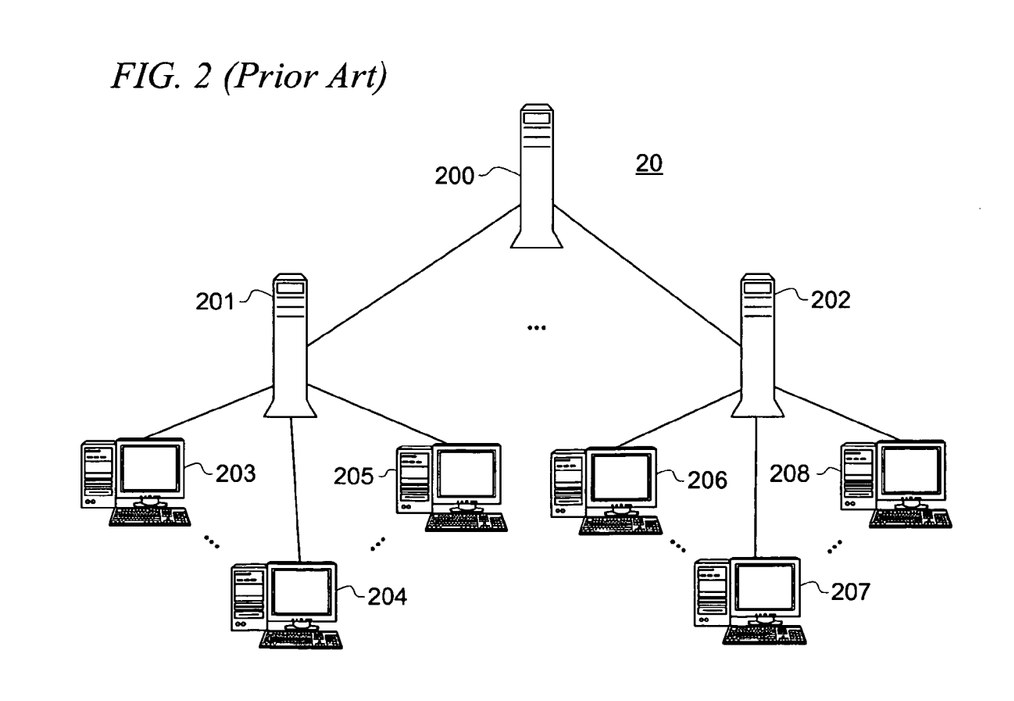
FIG. 2 is a block diagram illustrating a typical edge network.

FIG. 2 is a block diagram illustrating edge network 20. When employed as a CDN, the central access point is maintained by central server 200, while edge servers 201 and 202 each have a copy of the content that is available through the CDN. Depending on their location, clients 203-208 may access the content through local, edge servers 201 or 202. For example, clients 203-205 access the CDN through edge server 201, while clients 206-208 access through edge server 202. If client 206 wishes to obtain a piece of content, it negotiates with central server 200 for the content, which may be downloaded through edge server 202. If client 205 wishes to obtain the same piece of content, it also negotiates for the content with central server 200, which may be downloaded through edge server 201. By relieving central server 200 of the tasks of streaming the data for the content to both clients 205 and 206, it is free to server more of the clients directly in negotiating for content.

FIG. 2 may also represent a multi-server collaboration system of the type operated by WEBEX™. WEBEX™ uses multiple servers to manage and maintain its electronic meetings. Because of its proprietary network, it is more easily capable of managing a single meeting over multiple servers. For example, a copy of everything supporting an electronic meeting may be stored on each of central server 200 and edge servers 203-208. Thus, as client 208 logs into edge server 202 to join the single electronic meeting with clients 203-207, its participation in the meeting is managed by edge server 202. Similarly, client 204, logs onto the meeting through edge server 201. Both of clients 204 and 208 are participating in the same meeting. However, the meeting is managed by both edge servers 201 and 202. Another client (not shown) may even connect directly to central server 200 to participate in the meeting because central server 200 also maintains a copy of all of the information necessary to run the meeting.

While the proprietary network of WEBEX™ allows for such a multi-server management, management of the complexity of an electronic meeting using the Internet as its infrastructure has typically been limited to a single-server system. Such systems, as noted above, are limited in the number of participants it can support at any given time.

BRIEF SUMMARY OF THE INVENTION

The present invention is directed to a system and method for establishing a collaboration network. The network is started by creating a virtual meeting room on a central or origin server. The central server negotiates with one or more edge servers for remote management of selected collaboration parameters, which control such things as shared objects, group connections, streaming video, and video on-demand. Using the selected collaboration parameters, the edge servers manage the meeting participation of the network clients connected to the virtual meeting room through the individual edge servers. When management of the meeting participation requires either parameters that the edge server does not have or when the parameters of the edge server are out of date, the management responsibility is transferred to the central or origin server for that request.

By passing management duties down to the edge servers using the collaboration parameters, the collaboration network reduces the processing load on the central server. For example, when managing shared objects, the edge servers can verify appropriate client interactions with the shared objects by simply comparing its shared object version number against the client's version number. If they do not match, then the edge server will reject the change without involving the central server.

Additionally, the edge servers can manage the connection load into the central or origin server. The edge server takes each individual connection to a client and forms a virtual group connection between the edge server and the origin server. This connection only appears as a single connection into the central server regardless of the number of clients connected into that edge server. This feature allows more clients to participate in an electronic meeting or collaboration without overly loading the central or origin server.

Another collaboration parameter assists in managing streaming video. Because the virtual group connection counts only as a single connection to and from the central server, a video stream from the central or origin server only needs to be copied and transmitted to the number of connected edge servers. The edge servers will then take that streaming video, copy it, and transmit the copies to each client connected to it. This takes a considerable amount of copying load from the central server and distributes it around the collaboration network.

Yet another collaboration parameter assists in managing on-demand video. Various embodiments of the present invention provide for an additional priority level assigned to on-demand video data. This priority level is the lowest out of audio, streaming video, and data. At opportune times during the network communication, the video packets making up the on-demand video are transmitted to the edge server that manages the requesting client.

The edge server may also cache the on-demand video locally. The edge server includes functionality that attempts to build, maintain, and self-correct the caches. When the first client requests the on-demand video, the cache may have missing video packets due to problems in the transport network or due to the client stopping the download. The edge server notes these missing packets. As a subsequent client requests the same on-demand video. The edge server will start transmitting the video packets from the local cache. When a missing packet location is encountered, the edge server requests the missing packet from the central or origin server. Both the central server and the edge server maintain the on-demand video and cache in the same format. Therefore, as soon as the edge server receives the missing packet, it can be dropped directly into the transmission stream and placed into the cache at the appropriate location. Through multiple downloads, the described embodiment may self-correct the cache to be an exact duplicate of the on-demand video stored at the source on the central server.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 3:
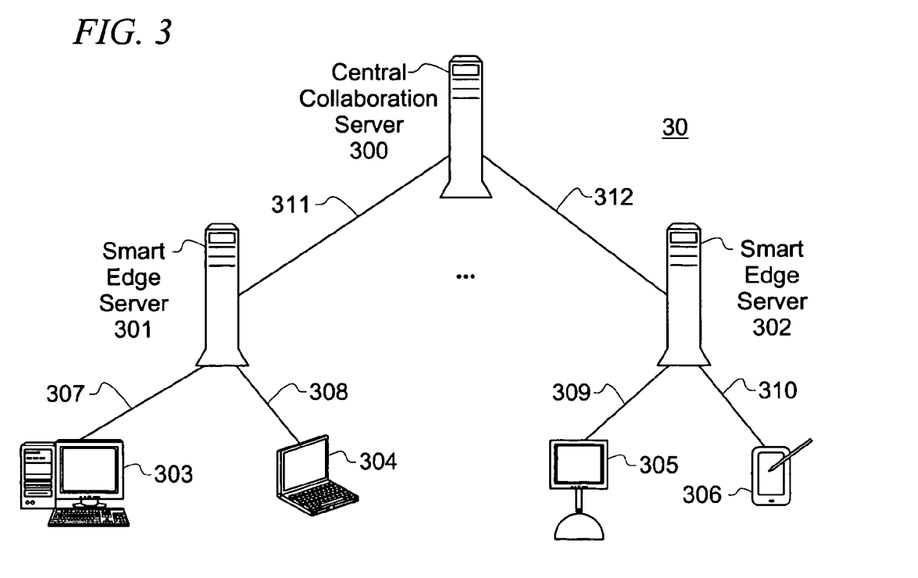
FIG. 3 is a block diagram illustrating a smart edge collaboration network configured according to one embodiment of the present invention.

FIG. 3 is a block diagram illustrating smart edge collaboration network 30 configured according to one embodiment of the present invention. Central collaboration server 300, which is the origin server for the multi-server electronic meeting, maintains management over an electronic meeting comprising clients 303-306 as participants. However, clients 303 and 304 connect into the meeting through smart edge server 301, while clients 305 and 306 connect into the meeting through smart edge server 302.

As clients 303-305 request to enter the electronic meeting, each submits some kind of meeting identifier, such as an ID number, URL, or the like, which identifies the meeting on central collaboration server 300. This identifier is first transmitted to the connecting edge server. For example, a user enters the meeting identifier into client 305 that identifies the meeting on central collaboration server 300. However, client 305 transmits the meeting identifier to smart edge server 302. Smart edge server 302 analyzes the meeting identifier to determine that it is to communicate the meeting identifier to central collaboration server 300. Therefore, smart edge server 302 negotiates with central collaboration server 300 to establish a communication link and then transmits the meeting identifier.

Central collaboration server 300 establishes the meeting room to share communications between clients 303-306 and begins to transmit the data supporting the meeting room to smart edge servers 301 and 302. Unlike single-server client-server collaboration systems, smart edge collaboration system 30 provides one connection to central collaboration server 300 for each smart edge server participating in the electronic meeting communication stream regardless of the number of clients connected into the meeting. Thus, smart edge collaboration system 30, as depicted in FIG. 3, comprises only two connections, connection 311 and 312, into central collaboration server 300, even though four clients, clients 303-306, are illustrated as participating in the electronic meeting. This connection management is provided by technology described in commonly-assigned, co-pending U.S. patent application Ser. No. 11/263,074 entitled "VIRTUAL GROUP CONNECTION," currently abandoned, the disclosure of which is incorporated herein by reference. This connection management technology is implemented in smart edge servers 301 and 302. Smart edge servers 301 and 302 establish a virtual group connection between the smart edge servers and central collaboration server 300. Clients 303-306 each connect to smart edge servers 301 and 302 through individual connections 307-310.

Smart edge servers 301 and 302 include logic that assists central collaboration server 300 manage the electronic meeting. Smart edge servers 301 and 302 do not merely keep an entire mirrored copy of the electronic meeting running locally, but instead provide smart data stream management that takes some of the load off of central collaboration server 300. For example, in one meeting embodiment, a shared screen maybe one of the meeting objects viewed by each of the meeting participants, clients 303-306. The data for the location of the shared cursor is a shared asset. Any of clients 303-306 may take control of the cursor at any one time, thus, changing the data underlying the cursor location that will be shared to the other meeting participants. However, if one of the meeting participants is controlling the cursor, another participant cannot control the cursor until the other participant gives up control.

In managing such a feature, central collaboration server 300 maintains the main version of the shared data. Smart edge servers 301 and 302 each obtain copies of the shared data with the same version as in central collaboration server 300. Smart edge servers 301 and 302, thereafter, manage the dissemination and control of the shared data between the individual meeting participants connected thereto, such as clients 303-306. A copy of the shared data is also provided to each of the participants connected to smart edge servers 301 and 302. If client 303 controls the cursor, new cursor data is transmitted from client 303 to smart edge server 301. Smart edge server 301 checks the data coming from client 303 to determine if there is anything facially wrong with it. If not, the data and the request to change the shared data is transmitted on to central collaboration server 300. Central collaboration server 300 checks the shared data that is proposed for change along with the proposed change and determines if client 303 is allowed to make that change. If so, central collaboration server 300 sends an acceptance to smart edge server 301, changes the data on the local version of the shared data at central collaboration server 300, and then transmits a data stream of the changes to any other smart edge servers connected into the meeting, such as smart edge server 302.

On receiving the acceptance from central collaboration server 300, smart edge server 301 updates its local version of the shared data, and transmits those changes to each of the other meeting participants connected to it, such as client 304. Client 303, the editing participant, receives an acknowledgement that its proposed changes are being implemented.

After client 303 begins controlling the cursor, client 305 attempts to move the cursor. When the proposed cursor change data is transmitted from client 305 to smart edge server 302, smart edge server 302 rejects the change without forwarding the request to central collaboration server 300, because smart edge server 302 is still receiving change data from central collaboration server 300. This signals smart edge server 302 that client 305 is not authorized to take control of the cursor.

In a slightly different scenario, after client 303 begins controlling the cursor, but before central collaboration server 300 begins transmitting the changes to the other smart edge servers, client 305 attempts to control the cursor. The proposed cursor change data is transmitted to smart edge server 302. Because smart edge server 302 has not received any updated data from central collaboration server 300, smart edge server 302 approves the changes and sends them on to central collaboration server 300 for further consideration. However, because client 303 has already initiated control over the cursor and has transmitted data to central collaboration server 300, central collaboration server 300 rejects the proposed changes submitted by client 305. Thus, considering the two examples, the load on central collaboration server 300 is reduced.

Embodiments of the present invention that handle this data sharing within the smart edge server network may employ the shared data technology in commonly-assigned, co-pending patent application Ser. No. 10/402,357, now U.S. Pat. No. 7,287,256 issued Oct. 23, 2007, entitled "SHARED PERSIS-TENT OBJECTS," and commonly-assigned, co-pending patent application Ser. No. 11/263,590, now U.S. Pat. No. 7,945,615 issued May 17, 2011, entitled, "DISTRIBUTED SHARED OBJECTS," the disclosures of which are incorporated herein by reference.

Figure 4:
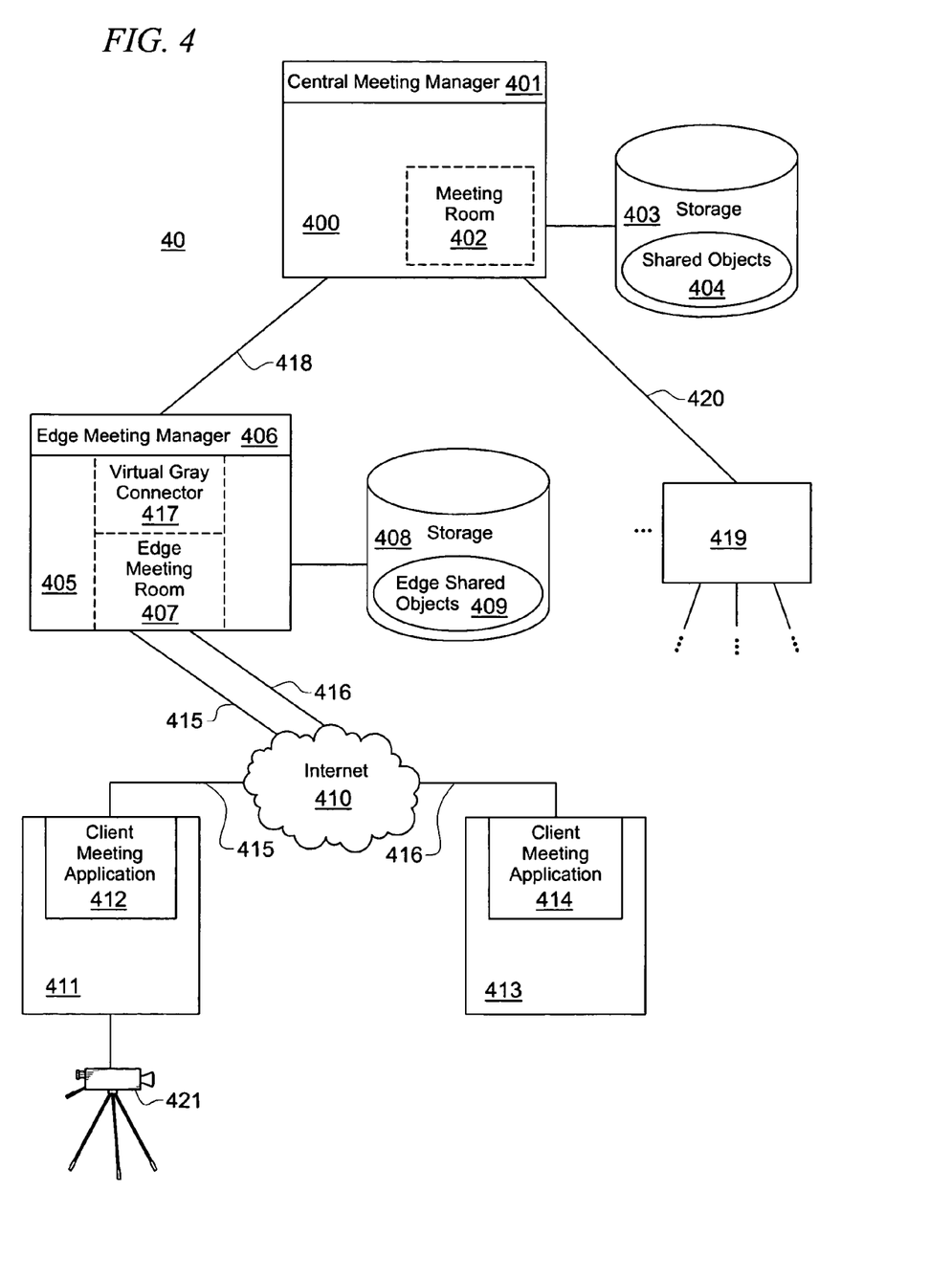
FIG. 4 is a block diagram illustrating a collaboration system configured according to one embodiment of the present invention.

FIG. 4 is a block diagram illustrating collaboration system 40 configured according to one embodiment of the present invention. Central server 400 includes central meeting manager 401, which is an application that monitors and manages any electronic meetings or collaboration sessions held on central server 400. Central server 400 and central meeting manager 401 create the visual meeting room, meeting room 402. Central server 400 also maintains communication with storage facility 403, which stores various pieces of data supporting the electronic meeting in meeting room 402. One such set of data that may be stored within storage facility 403 are shared objects 404. Shared objects are shared assets as described in commonly-assigned, co-pending patent application Ser. No. 10/402,357, now U.S. Pat. No. 7,287,256 issued Oct. 23, 2007, entitled, "SHARED PERSISTENT OBJECTS," and commonly-assigned, co-pending patent application Ser. No. 11/263,590, now U.S. Pat. No. 7,945,615 issued May 17, 2011, entitled, "DISTRIBUTED SHARED OBJECTS." Other meeting data may also be stored in storage facility 403, such as text and multimedia documents, as well as administrative data for keeping track of the identification information for each of the meeting participants, such as meeting participants 411 and 413, or locations and connection maps to each available edge server, such as edge servers 405 and 419.

Edge servers 405 and 409 are each connected to central server 400 using a real-time communication protocol suitable for real-time applications through connections 418 and 420. Examples of such a protocol are Real-time Transport Protocol (RTP), MACROMEDIA INC.'s REAL-TIME MESSAGING PROTOCOL™ (RTMP), and the like. As detailed by the illustration of edge server 405, edge servers include edge meeting manager 401 to coordinate meeting communication for electronic meeting room 402. Edge meeting manager 406 also creates edge meeting room 407, which manages the various data streams communicated as a part of the electronic meeting. Edge meeting room 407 is not a mirrored image of meeting room 402, but instead associates and manages the data streams underlying meeting room 402. As a part of its management of the connected participants, such as meeting participants 411 and 413, edge server 405 also includes virtual group connector 417, which creates a single, virtual group connection out of individual participant connections 415 and 416. Individual participant connections 415 and 416 are also made using a real-time-suitable communication protocol. Virtual group connector 417 employs one embodiment of connection technology described in commonly-assigned, co-pending patent application Ser. No. 11/263,074, currently abandoned, entitled, "VIRTUAL GROUP CONECTION," the disclosure of which is incorporated herein by reference.

Edge server 405 also maintains communication with local storage facility 408. Edge meeting manager 406 coordinates with central meeting manager 401 to determine various pieces of data to store or cache locally at local storage facility 408 associated with edge server 405. One class of meeting data that may be stored on local storage facility 408 is edge shared objects 409. In order to provide real-time sharing of such objects, locally caching the shared objects in edge shared objects 409 allows for faster delivery times of the shared objects. Edge server 405 performs some of the shared object management, thus, relieving central server 400 of some shared object management load. Edge meeting manager 406 coordinates with central meeting manager 401 to maintain the most-current version of the shared objects. Thus, in normal operation, the version of shared objects stored in storage facility 403, shared objects 404, will be the same version stored in local storage facility 408, edge shared objects 409. As a slot gets changed or modified in shared objects 404, central meeting manager 401 and edge meeting manager 406 perform either scheduled or ad hoc communication to synchronize the slot version onto edge shared object 409.

Meeting participants 411 and 413 each connect to central server 400 through edge server 405 in a reverse proxy format. In a reverse proxy format, the connecting client, e.g., meeting participant 411, enters the resource locator for central server 400. However, edge server 405 intercepts the connection request and establishes the connection between itself and meeting participant 411. Edge server 405 maintains a high quality connection with central server 400 using real-time connection 418. Thus, the connection to central server 400 through edge server 405 is transparent to meeting participant 411. Client meeting application 412 running on meeting participant 411 automatically detects the location and routing information for all of the available edge servers that it may connect to. Thus, when the client enters the resource locator for central server 400, client meeting application 412 selects the edge server with the best connection statistics for facilitating the connection to central server 400. In application, client meeting application 412 selects to make a connection to edge server 406 in order to connect into meeting room 402 hosted at central server 400. However, to meeting participant 411, it appears to connect directly to central server 400.

Collaboration system 40 also provides for efficient video streaming to each meeting participant. Because of the smart edge architecture, with edge servers 405 and 419, the load on central server 400 for streaming video is systematically reduced. Meeting participant 411 streams video into the electronic meeting through camera 421. The stream video is transmitted from meeting participant 411 to edge server 405. Edge server 405 re-transmits the video stream from camera 421 to central server 400. In existing collaboration systems, the central server would then make a copy for each participant and transmit each of those copies to each participant. With only a few participants, the work load would not be that great. However, with 1,000 or 10,000 participants, the constant copying of the stream to each participant would greatly load the central server.

Instead of relying on central server 400 to perform all of the copying, edge server 411 copies and transmits the streaming video to each participant connected to edge server 411. Thus, as depicted in FIG. 4, edge server 411 receives the streaming video from meeting participant 411, copies the stream once to transmit to central server 400, and then copy the stream a second time and transmit it to meeting participant 413. Central server 400 only has to then copy the stream and transmit the copy to any other edge server connected into the electronic meeting. As shown in FIG. 4, central server 400 copies the streaming video and transmits the copy to edge server 419 for further distribution to any other meeting participants connected thereto (Not Shown). Therefore, central server 400 is not required to perform as many copy and transmit steps as in existing collaboration systems because the added intelligence in edge server 405, through edge meeting manager 406, performs part of the distribution of the streaming video for central server 400.

Figure 5:
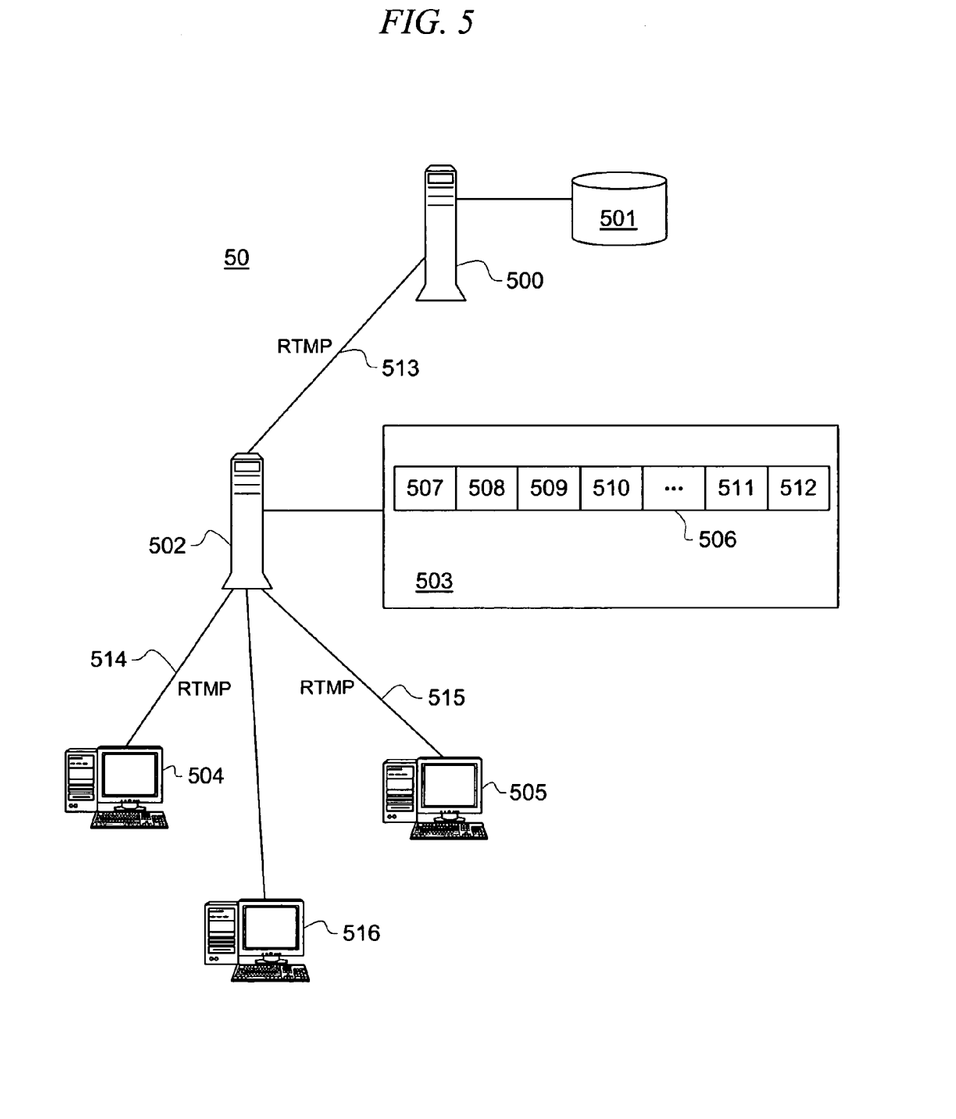
FIG. 5 is a block diagram illustrating a collaboration network configured according to one embodiment of the present invention.

FIG. 5 is a block diagram illustrating collaboration network 50 configured according to one embodiment of the present invention. The connections within collaboration network 50, connections 513-515, are each implemented using RTMP protocol. In sharing various data over collaboration network 50, each type of data may have a different priority or sensitivity to loss. With audio data, the goal is to send the data as fast as possible. Audio data is typically transmitted in a small packet size. Therefore, if a few audio packets get lost or dropped along the way, only a very small amount of audio data may be lost. Because of the way human hearing works, a relatively large amount of audio data may be lost and still be recognizable by the listener. Thus, audio data is transmitted with a high priority, as fast as possible, but it is transmitted in a lossy fashion.

Video data is typically transmitted in larger packets than audio. However, human vision also allows for a relatively large amount of video data to be lost while still allowing a perceptible visual presentation. Therefore, while video data are a lower priority than audio, it is also transmitted in a lossy fashion.

Data, however, is generally used by a logic process. Loss of data, therefore, could result in an error, inaccuracy, or the like. Thus, data is transmitted in a lossless fashion and carries a lower priority than both audio and video data. Therefore, because of the low priority, data may take longer to transmit than either audio or video data. However, all of the data will get through resulting in a lossless transmission.

When managing a collaboration network that may deliver on-demand video, it is more efficient to cache the requested video in a proxy server for any future requests from clients associated with that proxy server. In order to save space on the cache, existing systems typically change the format of the cached data. Additionally, however, when video data is transmitted in a real-time system using a lossy transport mechanism, each subsequent network client requesting to download the same video from the proxy server is limited to the state of the video data that is delivered to the proxy in response to the first request. Therefore, if the network was experiencing problems, such that a substantial amount of video data is lost in transmission between the central server and the proxy, any future downloads from that proxy cache will view the same low quality video.

Collaboration network 50 overcomes this problem by actually building a cache of the video data once a network client requests a first download. The video data is cached in a file format as close as possible to the original format of the video data. Additionally, a new priority is created for on-demand video. Connection 513, between edge server 502 and central server 500, is a virtual group connection, as described in the above-referenced, commonly-assigned, co-pending patent application Ser. No. 11/263,074, currently abandoned, and entitled, "VIRTUAL GROUP CONNECTION." Therefore, building the cache of the video file onto edge server 502 competes with all of the streaming, audio, video, and data flowing over connection 513 in support of an electronic meeting. The new priority allows for collaboration network 50 to build a cache of video data in a lossless manner, instead of a lossy transmission used for streaming video, but also, because of the lower priority, does so without seriously corrupting the bandwidth or tying up too many resources. When a subsequent network client connected to edge server 502 requests to download the same video file, it will receive as clean a copy of the cached video file regardless of what the network conditions were when the first network client downloaded the video.

In order to build up a robust cache of an on-demand video file at the same time higher priority audio, video, and data are streaming across the same connections, a just-in-time fill-in-the-blank process is used. For example, a video file is maintained by central server 500 on database 501. Network client 505 requests an on-demand download of this video. Central server 500 begins copying the video packets and transmitting the packets over connection 513 to edge server 502. Edge server 502 copies these video packets, sending one copy to network client 505 and the other copy to local database 503 to create local cache 506. Because of network congestions, edge server 502 only receives packet 507, 509, and 510. Network client 505 stops delivery of the video file after receiving packet 510. Therefore, local cache 506 consists of packets 507, 509, and 510. Edge server 502 determines that local cache 506 represents the original video file in database 501. It also notes where the gaps or holes in the file cached on local cache 506 are.

Network client 504 thereafter makes a request to download the same video file. The request, received first by edge server 502, is processed by edge server 502 after determining that local cache 506 comprises the requested video file. Edge server 502 copies packet 507 from local cache 506 and transmits it to network client 504. Because edge server 502 keeps track of the holes in local cache 506, it requests central server 500 to retrieve packet 508 from database 501. Responsive to this request, central server 500 copies packet 508 from database 501 and transmits it to edge server 502. Because edge server 502 caches the video file in the same or very similar format as it is saved on database 501, it is able to simply drop packet 508 into the transmission of the packets making up the video file with minimal additional processing. Edge server 502, thus, copies packet 508 transmitting one copy to network client 504 after transmitting packet 507 and another copy to local cache 506 filling in the gap between packets 507 and 509. Edge server 502 will continue copying available packets from local cache 506 and transmitting those packets to network client 504, requesting and dropping in the missing packets received from central server 500 after they arrive, additionally dropping in the missing packets into the gaps in local cache 506. This procedure minimizes the additional resource and bandwidth usage by central server 500 and results in a self-correcting functionality.

When edge server 502 makes a request to central server 500 for a missing packet, the request takes place in out-of-band signals. Therefore, the request for the packets to fill in the gaps will not take up the bandwidth reserved for the streaming electronic meeting data, video, or audio. Another out-of-band signal that may be exchanged between edge server 502 and central server 500 is a status signal. The status signal determines whether the data in local cache 506 is stale. In some instances, the video file may have been removed from database 501 because it is no longer to be played. However, the video file may still exist on a local database, such as local database 503. If a network client, such as network client 516, requests to download the video file, the request is received by edge server 502. In one embodiment of the present invention, edge server 502 sends an out-of-band signal request to central server 500 requesting whether the video file is stale or current. If central server 500 signals that the video file is stale or returns a signal that the file does not exist on database 501, edge server 502 will not download the file to network client 516 even though the file exists on local database 503. If central server 500 signals that the video file is still current, edge server 502 will begin copying and transmitting the packets of local cache 506.

Additional and/or alternative embodiments of the present invention may add the functionality to regularly schedule video updates. In such embodiments, at schedule times, edge server 502 sends an out-of-band signal to central server 500 identifying the missing packets in local cache 506. Central server 500 copies the requested packets from database 501 and transmits those missing packets to edge server 502. Because the missing packet is the same format as local cache 506, edge server 502 merely copies the received missing packet and drops it into place in local cache 506.

Figure 6:
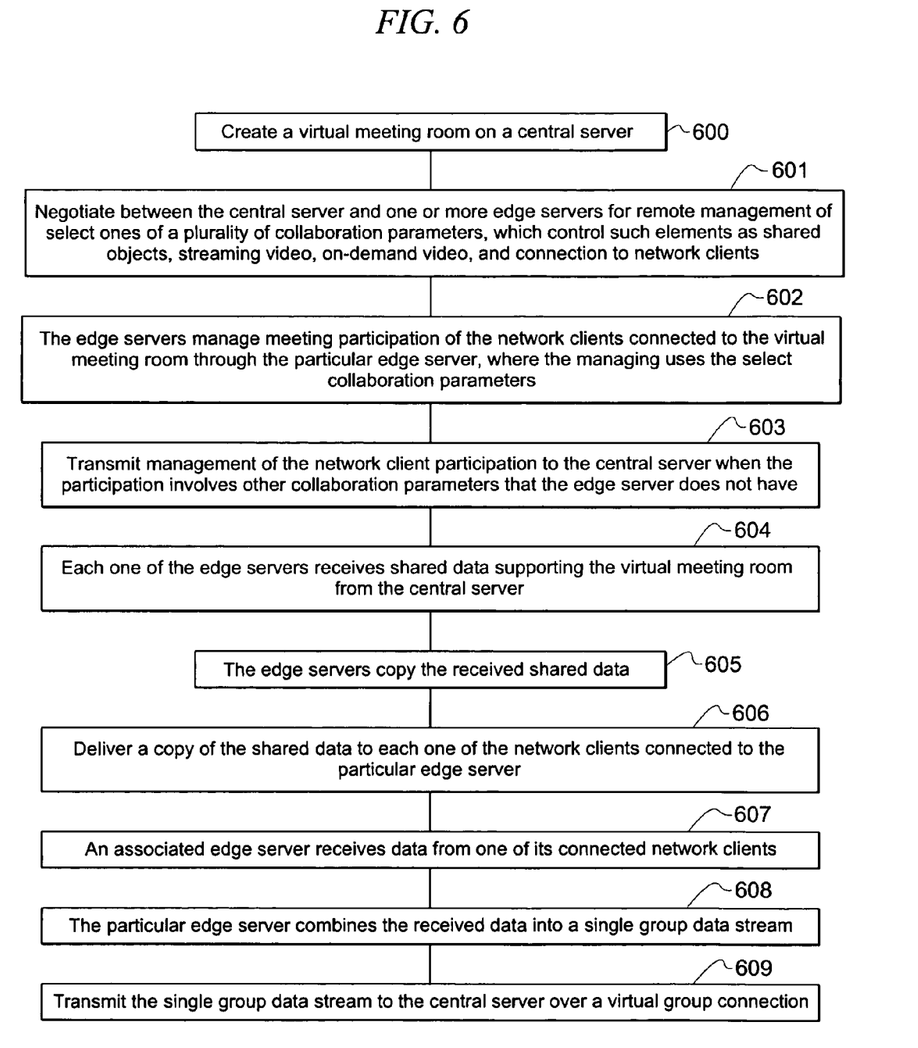
FIG. 6 is a flowchart illustrating example steps executed in implementing one embodiment of the present invention.

FIG. 6 is a flowchart illustrating example steps executed in implementing one embodiment of the present invention. In step 600, a virtual meeting room is created on a central server. The central server and the edge servers negotiate, in step 601, for remote management of select collaboration parameters, which control such elements as shared objects, streaming video, on-demand video, and connection to network clients. The edge servers manage meeting participation of the network clients connected to the virtual meeting room through the particular edge server, in step 602, where the managing uses the select collaboration parameters. In step 603, management of the network client participation is transmitted to the central server when the participation involves other collaboration parameters that the edge server does not have. Each one of the edge servers receives shared data supporting the virtual meeting room from the central server in step 604. The edge servers copy, in step 605, the received shared data. A copy of the shared data is delivered, in step 606, to each one of the network clients connected to the particular edge server. In step 607, an associated edge server receives data from one of its connected network clients. The particular edge server combines the received data into a single group data stream in step 608. The single group data stream is transmitted, in step 609, to the central server over a virtual group connection.

Figure 7:
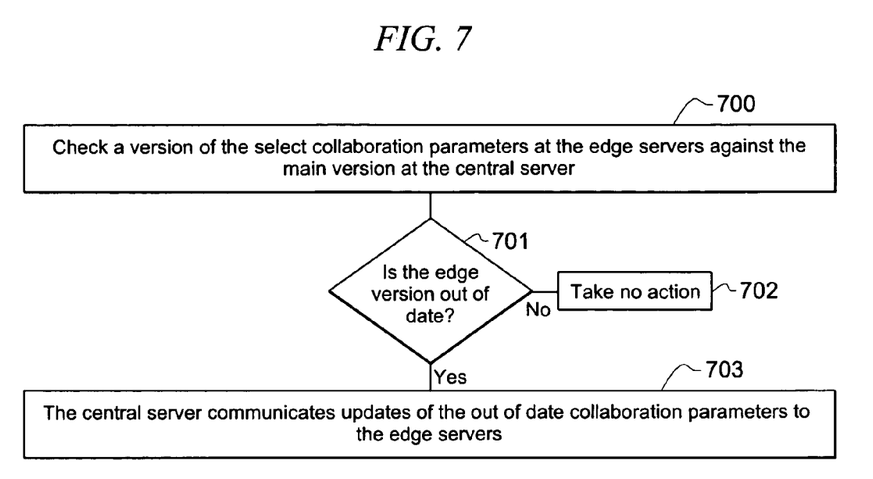
FIG. 7 is a flowchart illustrating example steps executed in implementing one embodiment of the present invention.

FIG. 7 is a flowchart illustrating example steps executed in maintaining the edge collaboration parameters in a collaboration environment configured according to one embodiment of the present invention. In step 700, a version of the select collaboration parameters is checked at the edge servers against the main version at the central server. A determination is made in step 701 whether the edge version out of date. If it is not out of date, then no action is taken in step 702. Otherwise, in step 703, the Central server communicates updates of the out of date collaboration parameters to the edge servers.

Figure 8:
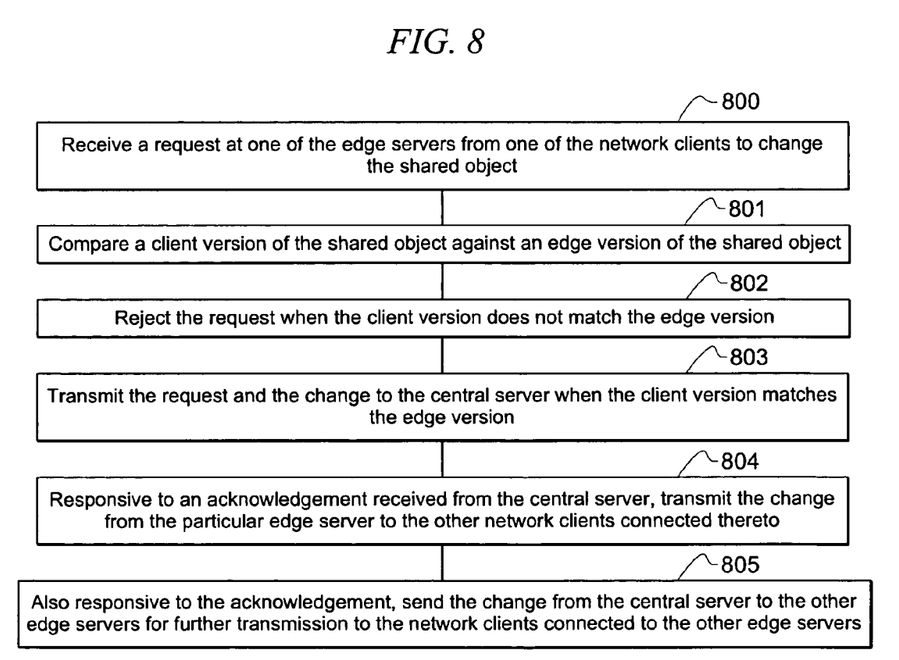
FIG. 8 is a flowchart illustrating example steps executed in implementing one embodiment of the present invention.

FIG. 8 is a flowchart illustrating example steps executed in managing shared objects in a collaboration environment configured according to one embodiment of the present invention. In step 800, one of the edge servers receives a request from one of its network clients to change the shared object. A client version of the shared object is compared against an edge version of the shared object in step 801. In step 802, the request is rejected when the client version does not match the edge version. Otherwise, in step 803, the request and the change are transmitted to the central server when the client version matches the edge version. In response to an acknowledgement received from the central server, the change from the particular edge server is transmitted to the other network clients connected thereto in step 804. Also responsive to the acknowledgement, the change from the central server is sent, in step 805, to the other edge servers for further transmission to the network clients connected to the other edge servers.

Figure 9:
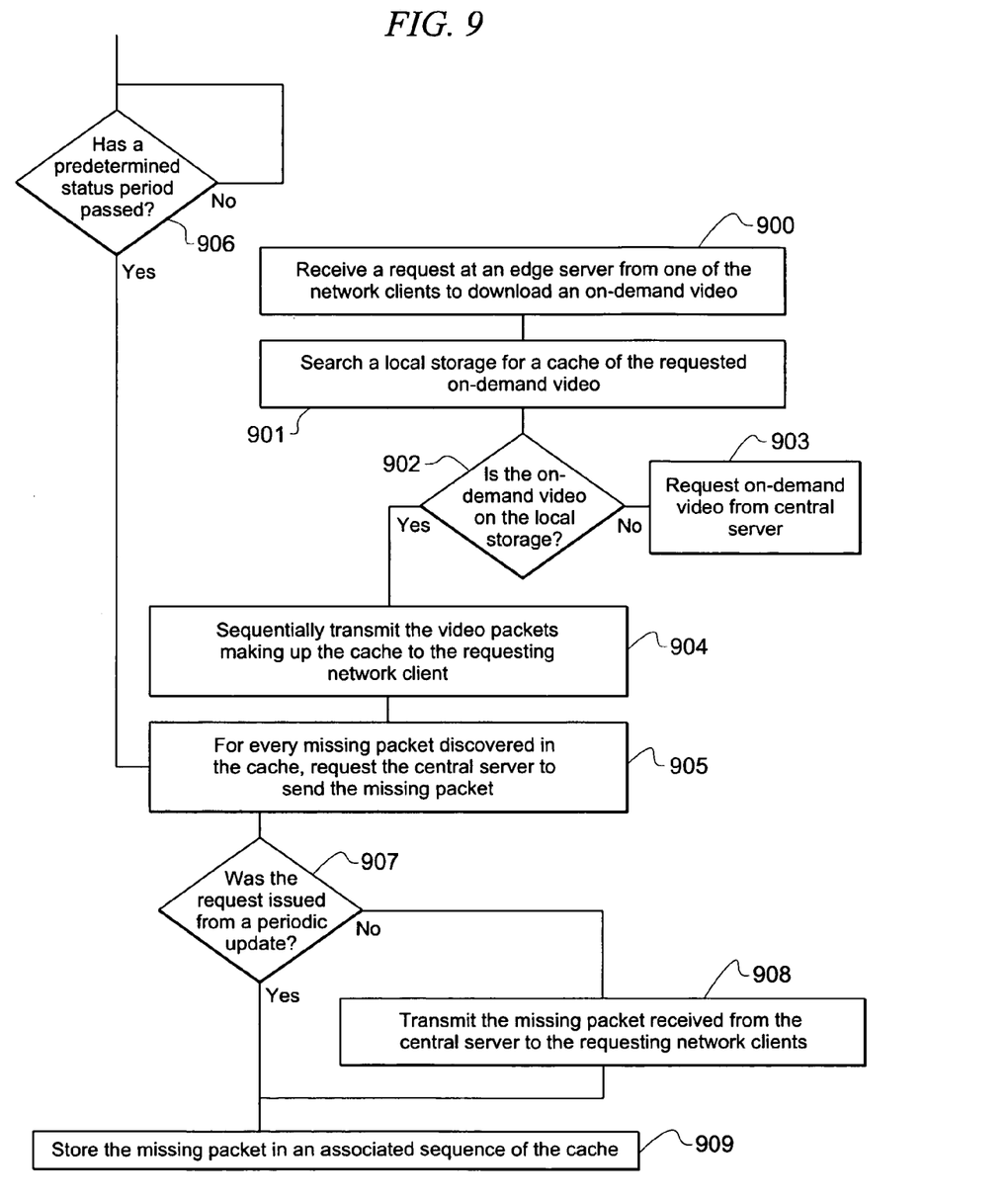
FIG. 9 is a flowchart illustrating example steps executed in implementing one embodiment of the present invention.

FIG. 9 is a flowchart illustrating example steps executed in managing on-demand video functionality in a collaboration environment configured according to one embodiment of the present invention. In step 900, a request is received at an edge server from one of the network clients to download an on-demand video. A local storage is searched, in step 901, for a cache of the requested on-demand video. In step 902, a determination is made whether the on-demand video is cached on the local storage. If not, the edge server requests the central server to download the requested on-demand video in step 903. Otherwise, in step 904, the video packets making up the cache are sequentially transmitted to the requesting network client. For every missing packet discovered in the cache, the central server is requested, in step 905, to send the missing packet.

In additional or alternative embodiments of the present invention, the updating may be a scheduled activity that takes place at a predetermined time or some other kind of period. In such embodiments, a determination is made, in step 906, whether this predetermined status period has passed. If not, then the system waits until the period has passed. Otherwise, if the time has passed, step 905 is executed. In step 907, a determination is made whether the request for update was made as a part of a periodic update. If not, then the missing packet received from the central server is transmitted, in step 908, to the requesting network clients. Regardless of whether the update was performed because of a periodic update, the missing packet is stored in an associated sequence of the cache in step 909.

The program or code segments making up the various embodiments of the present invention may be stored in a computer readable medium. The "computer readable medium" may include any medium that can store information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, and the like. The code segments may be downloaded via computer networks such as the Internet, Intranet, and the like.

Figure 10:
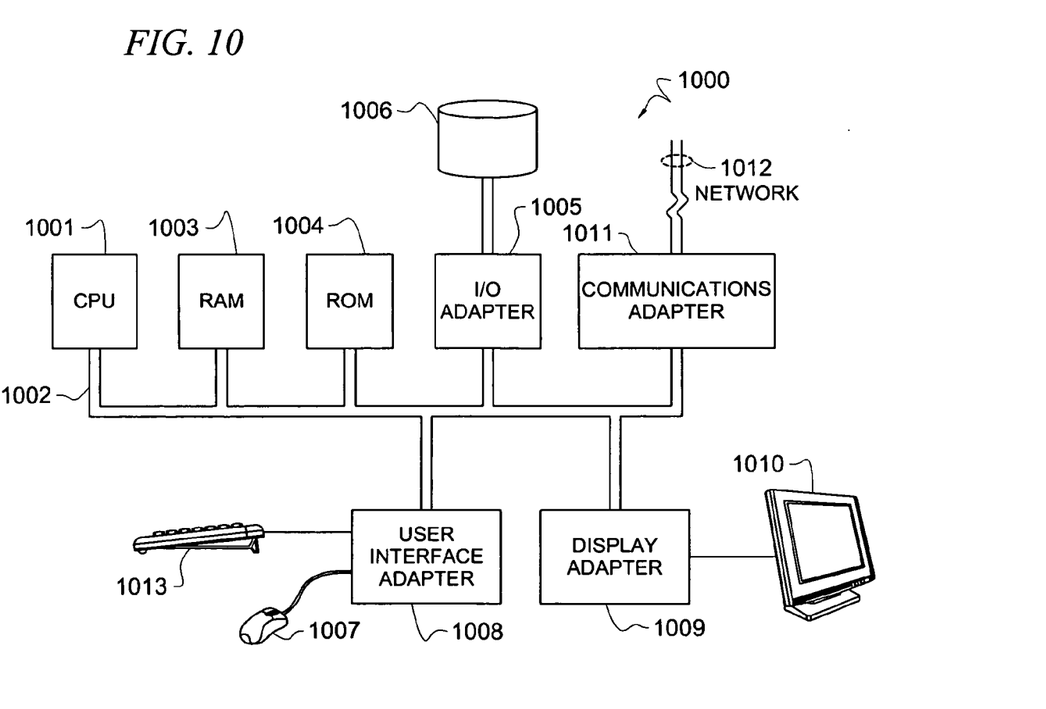
FIG. 10 illustrates a computer system adapted to use embodiments of the present invention.

FIG. 10 illustrates computer system 1000 adapted to use embodiments of the present invention, e.g. storing and/or executing software associated with the embodiments. Central processing unit (CPU) 1001 is coupled to system bus 1002. The CPU 1001 may be any general purpose CPU. However, embodiments of the present invention are not restricted by the architecture of CPU 1001 as long as CPU 1001 supports the inventive operations as described herein. Bus 1002 is coupled to random access memory (RAM) 1003, which may be SRAM, DRAM, or SDRAM. ROM 1004 is also coupled to bus 1002, which may be PROM, EPROM, or EEPROM. RAM 1003 and ROM 1004 hold user and system data and programs as is well known in the art.

Bus 1002 is also coupled to input/output (I/O) controller card 1005, communications adapter card 1011, user interface card 1008, and display card 1009. The I/O adapter card 1005 connects storage devices 1006, such as one or more of a hard drive, a CD drive, a floppy disk drive, a tape drive, to computer system 1000. The I/O adapter 1005 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 1011 is adapted to couple the computer system 1000 to a network 1012, which may be one or more of a telephone network, a local (LAN) and/or a wide-area (WAN) network, an Ethernet network, and/or the Internet network. User interface card 1008 couples user input devices, such as keyboard 1013, pointing device 1007, and the like, to the computer system 1000. The display card 1009 is driven by CPU 1001 to control the display on display device 1010.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:

receiving a first video stream from a first client at a first edge server from among multiple edge servers of a virtual meeting room having a central server in communication with the multiple edge servers, the first video stream including live images of a first meeting participant associated with the first client;

in response to said receiving, by the first edge server, of the first video stream from the first client,
transmitting, by the first edge server, the first video stream to the central server, and
transmitting, by the first edge server, the first video stream to one or more other clients connected to the first edge server and being different from the first client, without transmitting the received first video stream to the first client;

receiving the first video stream from the first edge server at the central server;

in response to said receiving, by the central server, of the first video stream from the first edge server, transmitting, by the central server, the first video stream to a first set of edge servers from the multiple edge servers of the virtual meeting room, the first set of edge servers comprising one or more other edge servers being different from the first edge server, without also transmitting the received first video stream to the first edge server;

receiving the first video stream, from the central server at the one or more other edge servers from the first set of edge servers;

in response to said receiving, by the one or more other edge servers from the first set of edge servers, of the first video stream from the central server, transmitting, by each of the one or more other edge servers from the first set of edge servers, the first video stream to corresponding one or more clients connected to each of the one or more other edge servers from the first set of edge servers;

receiving a second video stream from a second client different from the first client at a second edge server from among multiple edge servers of the virtual meeting room, the second video stream including live images of a second meeting participant associated with the second client;

in response to said receiving, by the second edge server, of the second video stream from the second client, transmitting, by the second edge server, the second video stream to the central server;

receiving the second video stream from the second edge server at the central server;

in response to said receiving, by the central server, of the second video stream from the second edge server, sending, by the central server to the second edge server, an instruction to switch from transmitting the first video stream to transmitting the second video stream, switching from said transmitting by the central server of the first video stream to the one or more other edge servers from the first set of edge servers to transmitting, by the central server, the second video stream to one or more other edge servers from a second set of edge servers of the virtual meeting room, the second set of edge servers comprising one or more other edge servers being different from the second edge server, without also transmitting the received second video stream to the second edge server;

receiving the switching instruction from the central server at the second edge server; and in response to said receiving, by the second edge server, of the switching instruction from the central server, switching from transmitting by the second edge server the first video stream to a set of clients connected to the second edge server to transmitting, by the second edge server, the second video stream to one or more clients connected to the second edge server and being different from the second client, without transmitting the received second video stream to the second client.

2. The method of claim 1 further comprising:

receiving a request at one of the multiple edge servers of the virtual meeting room from another client to download on-demand video;

searching a local storage at said one of the multiple edge servers for a cache of said requested on-demand video;

inquiring the central server, in response to finding that the cache of said requested on-demand video is stored on the local storage of said one of the multiple edge servers, by said one of the multiple edge servers whether the cache of the requested on-demand video stored on the local storage of said one of the multiple edge servers is current or stale;

receiving, by said one of the multiple edge servers, a response from said central server that the cache of said requested on-demand video stored at the local storage of said one of the multiple edge servers is current;

sequentially sending by said one of the multiple edge servers a plurality of video packets making up said cache of said requested on-demand video stored at the local storage of said one of the multiple edge servers to said other client;

for every missing packet discovered in said cache of said requested on-demand video stored at the local storage of said one of the multiple edge servers, requesting by said one of the multiple edge servers from said central server for said missing packet;

receiving by said one of the multiple edge servers said missing packet received from said central server; and storing said missing packet in an associated sequence of said cache of said requested on-demand video stored at the local storage of said one of the multiple edge servers at said one of the multiple edge servers.

3. The method of claim 2 wherein said cache of said requested on-demand video is stored at the one of the multiple edge servers in a same format as said on-demand video stored at said central server.

4. The method of claim 2 further comprising:

periodically requesting by said one of the multiple edge servers from said central server for one or more missing packets in the cache of said on-demand video stored at said one of the multiple edge servers;

receiving said one or more missing packets from said central server at said one of the multiple edge servers; and storing at said one of the edge servers said one or more missing packets in an associated sequence of said cache of said on-demand video.

5. The method of claim 1, wherein the second edge server is different from the first edge server, and the set of the clients connected to the second edge server to which the second server transmits the first video stream comprises all the clients connected to the second edge server.

6. The method of claim 1, wherein the second edge server is the same as the first edge server, and the set of the clients connected to the second edge server to which the second server transmits the first video stream represents the one or more other clients connected to the first edge server that are different from the first client.

7. The method of claim 1 further comprising:

receiving the second video stream, from the central server at the one or more edge servers from the second set of edge servers; and in response to said receiving, by the one or more edge servers from the second set of edge servers, of the second video stream from the central server, transmitting, by each of the one or more edge servers from the second set of edge servers, the second video stream to corresponding one or more clients connected to each of the one or more edge servers from the second set of edge servers.

8. A collaboration network comprising:

an origin server system configured to manage an electronic meeting;

a plurality of edge server systems associated with the electronic meeting and connected to said origin server system, wherein a first edge server system from among the plurality of edge server systems is configured to share management of the electronic meeting with the origin server system by performing operations including:

receiving a first video stream from a first client system that participates to the electronic meeting and is connected to the first edge server system, the first video stream including live images of a first meeting participant associated with the first client system;

in response to said receiving the first video stream from the first client system, transmitting the first video stream to the origin server system, and transmitting the first video stream to one or more other client systems that are connected to the first edge server and are different from the first client system, without transmitting the received first video stream to the first client system; and wherein the management of the electronic meeting performed by the origin server system includes operations including:

receiving, from the first edge server system, the first video stream;

in response to said receiving the first video stream from the first edge server system, transmitting the first video stream to a first set of edge server systems from the plurality of edge server systems associated with the electronic meeting, the first set of edge server systems comprising one or more other edge server systems that are different from the first edge server system, without also transmitting the received first video stream to the first edge server system, wherein a second edge server system from among the plurality of edge server systems is configured to share management of the electronic meeting with the origin server system by performing operations including:
receiving a second video stream from a second client system different from the first client system, the second video stream including live images of a second meeting participant associated with the second client system; and
in response to said receiving the second video stream from the second client system, transmitting the second video stream to the origin server;
wherein the management of the electronic meeting performed by the origin server system includes operations further including:
receiving the second video stream from the second edge server system;
in response to said receiving the second video stream from the second edge server system,
sending, to the second edge server system, an instruction to switch from transmitting the first video stream to transmitting the second video stream;
switching from said transmitting of the first video stream to the one or more other edge server systems from the first set of edge server systems to transmitting the second video stream to one or more other edge server systems from a second set of edge server systems of the electronic meeting, the second set of edge server systems comprising one or more other edge server systems that are different from the second edge server system, without also transmitting the received second video stream to the second edge server system,
wherein the second edge server system is configured to share the management of the electronic meeting with the origin server system by performing operations further including:
receiving the switching instruction from the origin server system; and
in response to said receiving the switching instruction from the origin server system, switching from transmitting the first video stream to a set of client systems connected to the second edge server system to transmitting the second video stream to one or more client systems connected to the second edge server system and being different from the second client system, without transmitting the received second video stream to the second client system.

9. The collaboration network of claim 8, wherein each of the one or more other edge server systems from the second set of edge server systems is configured to perform operations comprising:
receiving the second video stream from the origin server; and
in response to said receiving the second video stream from the origin server system, transmitting the second video stream to corresponding one or more client systems connected to each of the one or more other edge server systems from the second set of edge server systems.

10. The collaboration network of claim 8, wherein
the second edge server system is different from the first edge server system, and
the set of the client systems connected to the second edge server system to which the second server transmits the first video stream comprises all the client systems connected to the second edge server system.

11. The collaboration network of claim 8, wherein
the second edge server system is the same as the first edge server system, and
the set of the client systems connected to the second edge server system to which the second server transmits the first video stream represents the one or more other client systems connected to the first edge server system that are different from the first client.

12. A non-transitory computer readable medium encoded with a computer program, the computer program comprising instructions that when executed by data processor cause a plurality of servers to perform operations comprising:
receiving a first video stream from a first client at a first edge server from among multiple edge servers of a virtual meeting room having a central server in communication with the multiple edge servers, the first video stream including live images of a first meeting participant associated with the first client;
in response to said receiving, by the first edge server, of the first video stream from the first client,
transmitting, by the first edge server, the first video stream to the central server, and
transmitting, by the first edge server, the first video stream to one or more other clients connected to the first edge server and being different from the first client, without transmitting the received first video stream to the first client;
receiving the first video stream from the first edge server at the central server;
in response to said receiving, by the central server, of the first video stream from the first edge server, transmitting, by the central server, the first video stream to a first set of edge servers from the multiple edge servers of the virtual meeting room, the first set of edge servers comprising one or more other edge servers being different from the first edge server, without also transmitting the received first video stream to the first edge server;
receiving the first video stream, from the central server at the one or more other edge servers from the first set of edge servers;
in response to said receiving, by the one or more other edge servers from the first set of edge servers, of the first video stream from the central server, transmitting, by each of the one or more other edge servers from the first set of edge servers, the first video stream to corresponding one or more clients connected to each of the one or more other edge servers from the first set of edge servers;
receiving a second video stream from a second client different from the first client at a second edge server from among multiple edge servers of the virtual meeting room, the second video stream including live images of a second meeting participant associated with the second client;
in response to said receiving, by the second edge server, of the second video stream from the second client, transmitting, by the second edge server, the second video stream to the central server;
receiving the second video stream from the second edge server at the central server;
in response to said receiving, by the central server, of the second video stream from the second edge server,
sending, by the central server to the second edge server, an instruction to switch from transmitting the first video stream to transmitting the second video stream,
switching from said transmitting by the central server of the first video stream to the one or more other edge servers from the first set of edge servers to transmitting, by the central server, the second video stream to one or more other edge servers from a second set of edge servers of the virtual meeting room, the second set of edge servers comprising one or more other edge servers being different from the second edge server, without also transmitting the received second video stream to the second edge server;

receiving the switching instruction from the central server at the second edge server; and in response to said receiving, by the second edge server, of the switching instruction from the central server, switching from transmitting by the second edge server the first video stream to a set of clients connected to the second edge server to transmitting, by the second edge server, the second video stream to one or more clients connected to the second edge server and being different from the second client, without transmitting the received second video stream to the second client.

13. The non-transitory computer readable medium of claim 12, wherein the second edge server is different from the first edge server, and the set of the clients connected to the second edge server to which the second server transmits the first video stream comprises all the clients connected to the second edge server.

14. The non-transitory computer readable medium of claim 12, wherein the second edge server is the same as the first edge server, and the set of the clients connected to the second edge server to which the second server transmits the first video stream represents the one or more other clients connected to the first edge server that are different from the first client.

15. The non-transitory computer readable medium of claim 12, wherein the operations further comprise:

receiving the second video stream, from the central server at the one or more edge servers from the second set of edge servers; and in response to said receiving, by the one or more edge servers from the second set of edge servers, of the second video stream from the central server, transmitting, by each of the one or more edge servers from the second set of edge servers, the second video stream to corresponding one or more clients connected to each of the one or more edge servers from the second set of edge servers.

\* \* \* \* \*